United States Patent [19]
Danner et al.

[11] Patent Number: 4,728,469
[45] Date of Patent: Mar. 1, 1988

[54] METHOD AND APPARATUS FOR MAKING A PLASTIC LENS

[75] Inventors: Michael E. Danner, Kenton Hills; Nathan T. Lipscomb, Louisville, both of Ky.

[73] Assignee: Sperti Drug Products, Inc., Erlanger, Ky.

[21] Appl. No.: 823,339

[22] Filed: Jan. 28, 1986

[51] Int. Cl.⁴ .............................................. B29D 11/00
[52] U.S. Cl. ...................................... 264/1.4; 264/2.2; 264/2.5; 264/22; 425/174.4; 425/808
[58] Field of Search ................. 264/1.1, 1.4, 2.1, 2.2, 264/2.3, 22, 2.5; 249/82; 425/808, 174.4; 250/504 R; 350/1.6

[56] References Cited

U.S. PATENT DOCUMENTS

| | | | |
|---|---|---|---|
| 2,524,862 | 10/1950 | White | 425/808 |
| 2,525,664 | 10/1950 | Gadsby et al. | 425/808 |
| 3,605,195 | 9/1971 | Campbell | 264/2.2 |
| 4,166,088 | 8/1979 | Neefe | 425/808 |
| 4,197,266 | 4/1980 | Clark et al. | 264/2.3 |
| 4,298,005 | 11/1981 | Mutzhat | 350/1.6 |
| 4,382,902 | 5/1983 | Feurer | 425/808 |

FOREIGN PATENT DOCUMENTS 132221 10/1980 Japan .................................... 264/1.4

Primary Examiner—James Lowe
Attorney, Agent, or Firm—Kinney & Schenk

[57] ABSTRACT

A method and apparatus for making a plastic lens and a plastic lens made thereby are provided, the method comprising the steps of disposing a lens forming material comprising a liquid monomer and a photosensitive initiator into a mold cavity defined in part between a pair of spaced apart mold members each having a lens forming surface facing the cavity and an outer opposed surface, directing rays of ultraviolet light from a source thereof against the outer surface of at least one of the mold members so as to pass therethrough to act on the lens forming material in the cavity to produce the lens therefrom, and forming the outer surface of the one mold member with structure to cause the ultraviolet light directed thereagainst to be substantially evenly distributed throughout the lens forming material in the cavity in order to tend to prevent optical distortions in the lens being formed therefrom.

19 Claims, 3 Drawing Figures

METHOD AND APPARATUS FOR MAKING A PLASTIC LENS

BACKGROUND OF THE INVENTION

1. Field of the Invention

This invention relates to a new method and apparatus for making a plastic lens, such as an optical lens for use in eyeglasses and the like, as well as to a new plastic lens made by such method and/or apparatus.

2. Prior Art Statement

It is known to form a plastic lens by disposing a lens forming material comprising a liquid monomer and a photosensitive initiator into a mold cavity defined in part between a pair of spaced apart mold members each having a lens forming surface means facing the cavity and an outer opposed surface means, and then directing rays of ultraviolet light from a source thereof against the outer surface means of at least one of the mold members so as to pass therethrough to act on the lens forming material in the cavity to produce the lens therefrom. For example, see the Neefe U.S. Pat. No. 4,166,088.

Also see the Hungerford et al, U.S. Pat. No. 3,038,210 and the Grandperret U.S. Pat. No. 3,222,432 for similar apparatus wherein the lens forming material is heated in the mold cavity by external heat producing means.

Also see the Mutzhas U.S. Pat. No. 4,298,005 for disclosing a particular structure for creating ultraviolet light with the wavelength thereof in the range of 320 NM to 450 NM for hardening plastics.

SUMMARY OF THE INVENTION

One feature of this invention is to provide a new method and apparatus for making a plastic lens, such as an optical lens for use in eyeglasses and the like.

In particular, it was found according to the teachings of this invention that if the rays of ultraviolet light being directed through at least one of the mold members so as to pass therethrough to act on the lens forming material in the cavity of the mold apparatus is substantially evenly distributed throughout the lens forming material in the cavity, the resulting lens being formed therefrom tends to have less optical distortions therein, if any, than when such rays of ultraviolet light are not so evenly distributed.

It was further found, according to the teachings of this invention, that such substantial even distribution of the rays of ultraviolet light throughout the lens forming material in the mold cavity can be accomplished by providing the outer surface means of the mold member through which the rays of ultraviolet light are to pass with means to cause the ultraviolet light directed thereagainst to be substantially evenly distributed throughout the lens forming material in the mold cavity of mold apparatus.

For example, one embodiment of this invention provides a method for making a plastic lens and comprising the steps of disposing a lens forming material comprising a liquid monomer and a photosensitive initiator into a mold cavity defined in part between a pair of spaced apart mold members each having a lens forming surface means facing the cavity and an outer opposed surface means, then directing rays of ultraviolet light from a source thereof against the outer surface means of at least one of the mold members so as to pass therethrough to act on the lens forming material in the cavity to produce the lens therefrom, and forming the outer surface means of the one mold member with means to cause the ultraviolet light directed thereagainst to be substantially evenly distributed throughout the lens forming material in the cavity in order to tend to prevent optical distortions in the lens being formed therefrom.

Accordingly, it is an object of this invention to provide a new method for making a plastic lens, the method of this invention having one or more of the novel features of this invention as set forth above or hereinafter shown or described.

Another object of this invention is to provide a new apparatus for making a plastic lens, the apparatus of this invention having one or more of the novel features of this invention as set forth above or hereinafter shown or described.

Another object of this invention is to provide a new plastic lens made by the method and/or apparatus of this invention.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
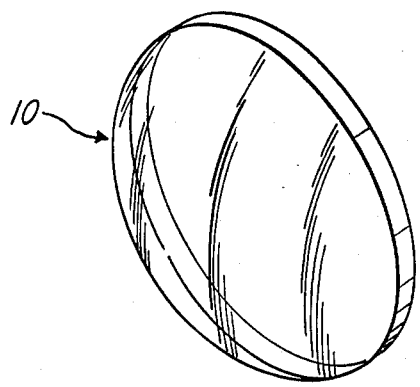
FIG. 1 is a perspective view of the new plastic lens of this invention.

While the various features of this invention are hereinafter illustrated and described as being particularly adapted to provide a method and apparatus for making a plastic lens for use in eyeglasses, it is to be understood that the method and apparatus of this invention can be utilized for forming lenses for other uses, such as lenses having high quality optical use for instrument sightings, photography, light filtration, etc.

Therefore, this invention is not to be limited to only the embodiment illustrated in the drawings, because the drawings are merely utilized to illustrate one of the wide variety of uses of this invention.

Referring now to FIG. 1, the new plastic lens of this invention is generally indicated by the reference numeral 10 and has been formed by the method and apparatus of this invention that is generally indicated by the reference numeral 11 in FIGS. 2 and 3 and which will be hereinafter described, the lens 10 being particularly adapted to be utilized in eyeglasses as the same is believed to be harder and thereby more scratch resistant than plastic lenses that have been formed by thermal curing, such as in the manner set forth in the aforementioned U.S. Pat. Nos. 3,038,210 and 3,222,432 whereby these two patents are being incorporated into this disclosure by this reference thereto.

In addition, it is believed that the lens 10 of this invention can be formed in substantially a shorter time period than the prior known thermal curing methods. For example, it is believed that to form a plastic lens by the prior known thermal curing methods requires approximately 8 to 14 hours whereas to form the plastic lens 10 of this invention by utilizing the method and apparatus 11 of this invention requires under 2 hours and such lens 10 has been found to be approximately 25% harder than the thermal cured lens.

As previously stated, it is known to form a plastic lens from a liquid lens forming material comprising a liquid monomer and a photosensitive initiator by cross-linking the monomer in conjunction with the initiator by directing rays of ultraviolet light from a source thereof through a pair of mold members to act on the lens forming material disposed between those mold members. For example, see the aforementioned Neefe U.S. Pat. No. 4,166,088 whereby this patent is being incorporated into this disclosure by this reference thereto.

However, it was found according to the teachings of this invention that the lens 10 of this invention will have fewer optical distortions, if any, if the rays of ultraviolet light are substantially evenly distributed throughout the lens forming material from which the lens 10 is being formed and such unique feature is provided by the method and apparatus 11 of this invention which will now be described.

Figure 2:
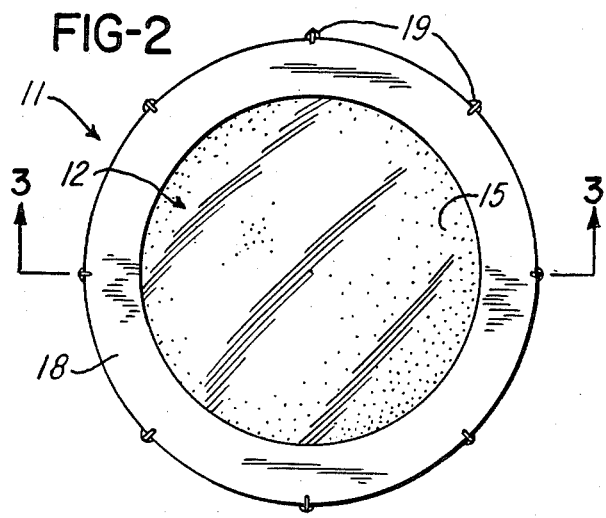
FIG. 2 is a reduced top view of a portion of the method and apparatus of this invention that is illustrated in FIG. 3, FIG. 2 being taken substantially on line 2—2 of FIG. 3.
Figure 3:
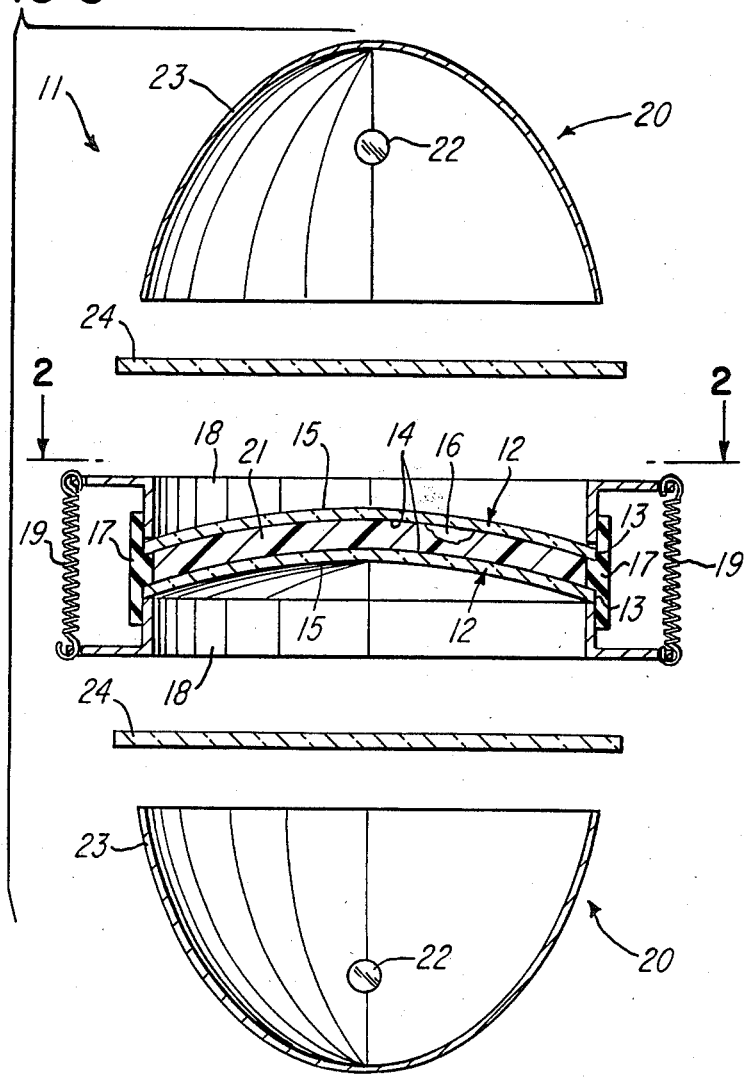
FIG. 3 is an enlarged fragmentary cross-sectional view taken on line 3—3 of FIG. 2 and schematically illustrating the method and apparatus of this invention.

As illustrated in FIGS. 2 and 3, the method and apparatus 11 of this invention comprises a pair of suitably shaped mold members 12 formed of any suitable material that will permit rays of ultraviolet light to pass therethrough and one such material comprises glass, each mold member 12 having an outer peripheral surface 13 and a pair of opposed surfaces 14 and 15 with the surfaces 14 being precision ground and the surfaces 15 being slightly frosted for a purpose hereinafter set forth.

In addition, the surface means 14 and 15 of each mold member 12 can have substantially the same configuration so that the thickness of that mold member 12 is substantially uniform throughout the same for a purpose hereinafter set forth.

The mold members 12 are adapted to be held in spaced apart relation to define in part a mold cavity 16 between the facing surfaces 14 thereof by a T-shaped flexible annular gasket 17 that seals the cavity 16 from the exterior of the mold members 12. The mold members 12 are held in assembled relation with the sealing gasket 17 by a pair of annular clamping members 18 that are held together with a suitable spring force, such as a spring force that is provided by the tension springs 19 illustrated in the drawings.

In this manner, it can be seen that in the embodiment illustrated in FIG. 3 of the drawings the upper mold member 12 has its inner surface means 14 concave while the lower mold member 12 has its inner surface means 14 convex so that the resulting mold cavity 16 will be properly shaped to form the lens 10 with the desired configuration. Thus, by merely selecting the mold members 12 with the desired surface means 14 thereof, lenses 10 with different characteristics, such as focal lengths etc., can be made by the method and apparatus 11 as is conventional in the art, such as set forth in the aforementioned patents, and will therefore not be further discussed.

The method and apparatus 11 of this invention has means 20 for directing rays of ultraviolet light respectively against the outer surface means 15 of the mold members 12 so as to pass therethrough and act on lens forming material 21 that has been disposed in the mold cavity 16 in a manner hereinafter set forth so as to form a lens 10 of this invention, each means 20 comprising an ultraviolet light producing device 22 disposed outboard of its respective mold member 12 and having the rays (not shown) of ultraviolet light thereof reflected by a suitably shaped hood type reflector 23 so as to pass through a suitable filter 24 to engage against the respective outer surface means 15 of the respective mold member 12. Each means 20 can be similar to the radiation apparatus set forth in the aforementioned patent to Mutzhas, U.S. Pat. No. 4,298,005 whereby this patent is being incorporated into this disclosure by this reference thereto.

However, each light source or device 22 preferably comprises a well known high pressure mercury lamp with a heavy metal additive, such as iron, because such lamp produces more energy in the 320 NM range although a standard mercury ultraviolet source can be used for a longer period of time and is believed to achieve the same results.

The filter 24 for each device 22 preferably comprises a well known pyrex glass plate which filters out wavelengths under approximately 300 NM and thereby prevents excessive heat buildup in the mold cavity 16. However, the lens forming material 21 in the mold cavity 16 is cooled during the curing cycle to maintain a maximum temperature thereof of approximately 80° C. and this is accomplished by passing cooling air from a source thereof (not shown) over the mold arrangement.

Thus, it is preferred that the ray generating devices 20 irridate the lens forming material 16 with ultraviolet light in the range of approximately 300 NM to approximately 450 NM as it is believed that the effective wavelength spectrum for curing the material 16 is from approximately 300 NM to approximately 450 NM.

Accordingly, it is preferred that the glass mold members 12 be formed from a suitable material so that the same will not pass wavelengths therethrough below approximately 300 NM and one such material that has been used successfully comprises Schott Crown or S-1 glass that is manufactured and sold by the Schott Optical Glass Inc., of Duryea, Pennsylvania.

It is believed, according to the teachings of this invention, that the frosting of the outer surface means 15 of such mold members 12 in combination with the ray directing means 20 will provide an even distribution of the ultraviolet light throughout the mold cavity 16 and thereby tend to prevent optical distortions in the lens 10 being made by the lens forming material 21 being irridated by such rays in the mold cavity 16. In addition, it is believed that by having the thickness of each mold member 12 being substantially the same throughout the area thereof that passes such rays therethrough, such rays will be more evenly distributed therethrough than if such thickness thereof varied.

While the lens forming material can comprise any suitable liquid monomer and any suitable photosensitive initiator, one such lens forming material that has been utilized to form the lens 10 of this invention comprised 1 to 8 percent of benzil dimethyl ketal by weight (or could be from its related chemical family) dissolved in diethylene glycol bis(allyl carbonate). This dissolved liquid mixture 21 should be filtered for quality control and is placed in the mold cavity 16 by pulling the gasket 17 at any selected point therein away from one of the mold members 12 and injecting the liquid lens forming material 21 into the cavity 16. Once the cavity 16 is filled with such material 21, the pulled portion of the gasket 17 is replaced into its sealing relation with the mold members 12 so that the material 21 can be irridated with ultraviolet light from both sides by the means 20 respectively directly the ultraviolet rays from the devices 22 through the filters 24 and the respective mold members 12 in the manner previously set forth for the time period that is necessary to cure the material 21 with the ultraviolet light having a wavelength in the range of approximately 300 NM to approximately 450 NM in the mold cavity 16 and with the frosted surface means 15 of the mold members 12 in combination with the reflectors acting to distribute that ultraviolet light substantially evenly throughout the material 21 in the mold cavity 16 during such time period.

However, it is to be understood that it is believed that the lens forming material 21 could be cured in the above manner by merely directing rays of ultraviolet light from one directing means 20 through its respective mold member 12 rather than utilizing both means 20 as previously described.

Also, it is to be understood that once the cured lens 10 is removed from the mold cavity 16 by disassembling the mold members 12 in a manner well known in the art, the lens 10 can be further processed, such as having its peripheral edge ground, etc., all in a manner conventional in the art.

Therefore, it can be seen that this invention not only provides a new method and apparatus for making plastic lenses, but also this invention provides a new lens made by the method and/or apparatus of this invention.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method for making a plastic lens comprising the steps of disposing a lens forming material comprising a liquid monomer and a photosensitive initiator into a mold cavity defined in part between a pair of spaced apart mold members each having a lens forming surface means facing said cavity and an outer opposed surface means, and then directing rays of ultraviolet light from a source thereof against said outer surface means of at least one of said mold members so as to pass therethough to act on said lens forming material in said cavity to produce said lens therefrom, the improvement comprising the step of frosting said outer surface means of said one mold member to cause said ultraviolet light directed thereagainst to be substantially evenly distributed throughout said lens forming material in said cavity in order to tend to prevent optical distortions in said lens being formed therefrom.

2. A method as set forth in claim 1 and including the step of forming said one mold member to have a substantially uniform thickness throughout the area thereof that passes said rays of ultraviolet light therethrough.

3. A method as set forth in claim 1 wherein the step of directing ultraviolet light from a source thereof and through said one mold member causes said lens forming material in said cavity to be subjected to ultraviolet light having a wavelength in the range of approximately 300 NM to approximately 450 NM.

4. A method as set forth in claim 1 wherein said mold members each comprises glass.

5. A method as set forth in claim 1 wherein said source of ultraviolet light has reflector means for directing the rays thereof toward said cavity.

6. A method as set forth in claim 1 wherein said source of ultraviolet light has filter means through which the rays thereof must pass before reaching said one mold member.

7. A method as set forth in claim 1 and including the steps of forming said source of ultraviolet light to comprise a pair of ultraviolet light producing devices respectively disposed outboard of said mold members to respectively direct the rays of ultraviolet light thereof against said outer surface means of said mold members so as to pass therethrough to act on said lens forming material in said cavity to produce said lens therefrom, and frosting said outer surface means of the other mold member to cause said ultraviolet light directed thereagainst by its respective device to be substantially evenly distributed throughout said lens forming material in said cavity in order to tend to prevent optical distortions in said lens being formed therefrom.

8. A method as set forth in claim 7 and including the step of forming each of said mold members to have a substantially uniform thickness throughout the area thereof that passes its respective rays of ultraviolet light therethrough.

9. A method as set forth in claim 8 wherein each device in combination with its respective mold member causes said lens forming material in said cavity to be subjected to ultraviolet light having a wavelength in the range of approximately 300 NM to approximately 450 NM.

10. In an apparatus for making a plastic lens from a lens forming material that comprises a liquid monomer and a photosensitive initiator, said apparatus comprising a mold cavity defined in part as a pair of spaced apart mold members defining part of a mold cavity therebetween, each mold member having a lens forming surface means facing said cavity and an outer opposed surface means, and means for directing rays of ultraviolet light against said outer surface means of at least one of said mold members so as to pass therethrough to act on said lens forming material in said cavity to produce said lens therefrom, the improvement wherein said outer surface means of said one mold member has been frosted to cause said ultraviolet light directed thereagainst to be substantially evenly distributed throughout said lens forming material in said cavity in order to tend to prevent optical distortions in said lens being formed therefrom.

11. An apparatus as set forth in claim 10 wherein said one mold member has a substantially uniform thickness throughout the area thereof that passes said rays of ultraviolet light therethrough.

12. An apparatus as set forth in claim 10 wherein said means for directing rays of ultraviolet light and through said one mold member is adapted to cause said lens forming material in said cavity to be subjected to ultraviolet light having a wavelength in the range of approximately 300 NM to approximately 450 NM.

13. An apparatus as set forth in claim 10 wherein said mold members each comprises glass.

14. An apparatus as set forth in claim 10 wherein said means for directing rays of ultraviolet light has reflector means for directing the rays from a source thereof toward said cavity.

15. An apparatus as set forth in claim 10 wherein said means for directing rays of ultraviolet light has filter means through which the rays thereof must pass before reaching said one mold member.

16. An apparatus as set forth in claim 10 wherein said means for directing rays of ultraviolet light comprises a pair of ultraviolet light producing devices respectively disposed outboard of said mold members to respectively direct the rays of ultraviolet light thereof against said outer surface means of said mold members so as to pass therethrough to act on said lens forming material in said cavity to produce said lens therefrom, said outer surface means of the other mold member having been frosted to cause said ultraviolet light directed thereagainst by its respective device to be substantially evenly distributed throughout said lens forming material in said cavity in order to tend to prevent optical distortions in said lens being formed therefrom.

17. An apparatus as set forth in claim 16 wherein said mold members each has a substantially uniform thickness throughout the area thereof that passes its respective rays of ultraviolet light therethrough.

18. An apparatus as set forth in claim 17 wherein each device in combination with its respective mold member is adapted to cause said lens forming material in said cavity to be subjected to ultraviolet light having a wavelength in the range of approximately 300 NM to approximately 450 NM.

19. An apparatus as set forth in claim 18 wherein said mold members comprise glass and said lens forming surface means thereof are precision ground.

* * * * *